(No Model.)

W. C. S. COY.
FRUIT HOLDER.

No. 574,476.  Patented Jan. 5, 1897.

Attest.
George Crane
J. E. Rossell

Inventor.
William C. S. Coy
by M. M. Cady atty.

UNITED STATES PATENT OFFICE.

WILLIAM C. S. COY, OF DUBUQUE, IOWA.

FRUIT-HOLDER.

SPECIFICATION forming part of Letters Patent No. 574,476, dated January 5, 1897.

Application filed June 15, 1896. Serial No. 595,710. (No model.)

*To all whom it may concern:*

Be it known that I, WILLIAM C. S. COY, a citizen of the United States, residing at Dubuque, in the county of Dubuque and State of Iowa, have invented certain new and useful Improvements in Fruit-Holders; and I do hereby declare the following to be a full, clear, and exact description of the invention, such as will enable others skilled in the art to which it appertains to make and use the same.

The object of my invention is to provide a holder for fruit, more especially peaches, plums, and the like, having pits or stones, which holder shall be adapted to be inserted through the meat of the fruit and grasp the pit or center and hold the fruit wholly from the inside, so that the entire outer surface is presented for paring or eating without the necessity of the hands coming in contact with the fruit.

It consists of a pair of tongs or tweezers having two sets of sharp points or prongs united by a common handle, which points or prongs are provided with outwardly-turned ends which may be inserted within the end of the fruit and made to grasp the pit or center of the same, when it may be held by the handle.

In describing this invention attention is invited to the accompanying drawings, which form a part hereof, and in which—

Figure 1:
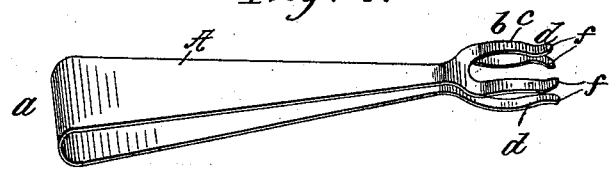
Figure 2:
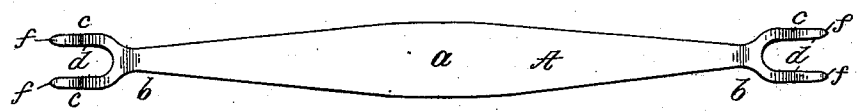
Figure 3:
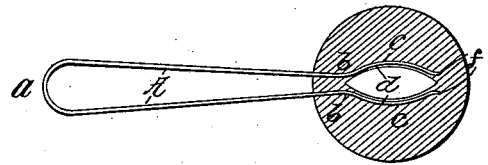

Figure 1 is a perspective of the invention. Fig. 2 is a blank from which the tongs are cut, and Fig. 3 is a section of a peach with the prongs of the holder grasping the pit.

Like letters of reference denote corresponding parts in all of the drawings.

A represents the body of the holder, which is preferably made of some elastic material, like spring-steel or brass, bent in the center at *a* to form the handle of the holder. The free ends *b*, which are thus brought close together, are each divided or portions cut out, leaving two or more prongs *d*, which may be sharpened to more readily enter the fruit. The prongs are concaved at *c* on their inner opposite sides for the purpose of more firmly grasping the pit or center of the fruit, and also that they shall displace as little as possible of the fruit when the holder is inserted. The ends of the prongs *f* are bent slightly outward that they may pass easily over the surface of the pit or stone without catching on irregularities of the surface.

The manner of using this device will be readily understood. The operator, holding the handle A, inserts the prongs into one end of the fruit until they come in contact with the pit, when they will slide along the surface between the pit and the meat of the fruit until the ends of the holder clasp the pit in the concave *c* of the prongs. The operator thus holds the fruit by the pit, or, if it be an apple, by the core.

It will be readily seen that the entire outer surface of the fruit is exposed for the purpose of paring or eating and will not be liable to either slide or turn upon the holder.

Having now described my invention, what I claim, and desire to secure by Letters Patent, is—

A fruit-holder made of spring sheet metal bent at its middle to form a spring-handle, and two arms, each arm having a bifurcated end, the tines being formed concaved for grasping the pit, and curved outwardly at their tips to slide over the sides of the stone, substantially as shown.

In testimony whereof I affix my signature in the presence of two witnesses.

WILLIAM C. S. COY.

Witnesses:
M. M. CADY,
GEO. M. CADY.